United States Patent [19]
Grathoff

[11] Patent Number: 5,305,868
[45] Date of Patent: Apr. 26, 1994

[54] COVER BELT CONVEYOR

[75] Inventor: Hartmut Grathoff, Wendelstein, Fed. Rep. of Germany

[73] Assignee: Man Gutehoffnungshütte, Oberhausen, Fed. Rep. of Germany

[21] Appl. No.: 979,296

[22] Filed: Nov. 20, 1992

[30] Foreign Application Priority Data

Nov. 21, 1991 [DE] Fed. Rep. of Germany ....... 4138226

[51] Int. Cl.⁵ .............................................. B65G 15/14
[52] U.S. Cl. ................... 198/626.4; 198/626.2
[58] Field of Search ................ 198/626.2, 626.3, 626.4

[56] References Cited

U.S. PATENT DOCUMENTS

| | | | |
|---|---|---|---|
| 2,966,254 | 12/1960 | Kaiser | 198/626.4 |
| 4,273,238 | 6/1981 | Blätermann et al. | 198/626.2 X |
| 4,666,032 | 5/1987 | Gough | 198/626.2 |
| 4,732,264 | 3/1988 | Engst | 198/626.2 X |

FOREIGN PATENT DOCUMENTS

| | | | |
|---|---|---|---|
| 1556581 | 1/1972 | Fed. Rep. of Germany . | |
| 0059112 | 4/1983 | Japan | 198/626.2 |
| 0148805 | 8/1985 | Japan | 198/626.4 |
| 60-148805 | 12/1985 | Japan . | |
| 0568574 | 12/1977 | U.S.S.R. | 198/626.4 |
| 0568575 | 12/1977 | U.S.S.R. | 198/626.4 |
| 0578227 | 1/1978 | U.S.S.R. | 198/626.4 |
| 418677 | 10/1934 | United Kingdom | 198/626.4 |
| 015574A1 | 2/1985 | United Kingdom . | |

*Primary Examiner*—D. Glenn Dayoan
*Attorney, Agent, or Firm*—McGlew and Tuttle

[57] ABSTRACT

A cover belt conveyor for delivering bulk materials or piece goods includes, a basic belt (1) and a cover belt (2), wherein at least one of these belts (1, 2) is driven. A space for the delivery strand (4) is formed in the central area of these belts, and at least the cover belt (2) is pressed on by elastic support rollers (6). At least one of the two belts (1, 2) has, in the vicinity of its two edge areas, reinforcements (3) made in one piece with the belt, which laterally delimit the delivery strand (4). The support rollers (6) above the cover belt (2) and/or the support rollers (5) under the basic belt (1) are mounted elastically on support structures (10). In the exemplary embodiment, two short support rollers (6) each for the cover belt (2) are mounted elastically in a common bracket (8) by of rubber bearings (9). The rubber bearings (9) permit the support rollers (6) to move by an angle in parallel to the delivery direction and in parallel to the width of the belt.

10 Claims, 5 Drawing Sheets

COVER BELT CONVEYOR

FIELD OF THE INVENTION

The present invention pertains to a cover belt conveyor for the horizontal, inclined or vertical or combined horizontal, inclined, and vertical delivery of bulk materials or piece goods, consisting of a basic belt and a cover belt, which two belts are compressed by support rollers, wherein at least one of the belts is driven.

BACKGROUND OF THE INVENTION

Cover belt conveyors of this class are used, e.g., for continuously operating ship unloaders. However, they may be used for other purposes as well.

In vertical cover belt conveyors, the bulk material is clamped in the central area of the cover belt and the basic belt, thereby forming a continuous delivery strand. At least one of these belts is driven. If only one belt is driven, the other belt is carried by friction.

To make it possible to deliver varying delivery flows between zero and the maximum possible amount, the delivery cross section must be able to be varied within corresponding limits. This can be achieved by elastically mounting all support rollers or the support rollers of one of the two belts, especially those of the cover belt, or, as in the case of expanded foam belt conveyors, by the cover belt being elastically deformable and being able to penetrate to different depths in the sets of support rollers arranged in a trough-like manner.

Two short support rollers are integrated within a common bracket. Each bracket is mounted on a support structure by means of a prior-art rubber bearing (bearing with elastic rubber elements).

The rubber bearings must permit a certain angle of movement around the axis that is parallel to the delivery direction of the belt and a certain angle of movement around the axis that is parallel to the width of the belt. A sufficient center distance between the rubber bearing and the edge of the belt, on the one hand, and the surface of the edge area of the cover belt, on the other hand, shall be present as well. Furthermore, the edge of the support roller jacket adjacent to the rubber bearing must be located at a certain distance from the center of the rubber bearing in the direction of the center of the belt, and this edge of the support roller jacket shall be rounded in order to prevent the edge of the support roller from penetrating into the belt of the conveyor.

The strands of the basic and cover belts, which move together in the upward or downward direction and clamp the material being delivered between them, are compressed and guided by a plurality of support rollers arranged at closely spaced locations.

SUMMARY AND OBJECTS OF THE INVENTION

It is an object of the present invention to design a cover belt conveyor which has a simpler design than the corresponding conveyors according to the state of the art, in which the belts used are insensitive to wear, in which a support belt for maintaining the stability is no longer used, and in which the belt surfaces that come into contact with the material being delivered can be easily cleaned.

According to the invention, a cover belt conveyor is provided which is particularly useful for inclined or vertical delivery of bulk materials and/or piece goods. The cover belt conveyor includes a basic belt and a cover belt wherein at least the cover belt is pressed onto the basic belt with rollers. The rollers are mounted elastically on support structures to change the delivery cross-section. At least one of the two belts includes compressible reinforcements made in one piece with the belt in edge areas with respect to a longitudinal direction of the belt in order to change the delivery cross-section. Sides of the reinforcements which are directed against the material being delivered are bulged in an outer direction and enclose an acute angle with the belt or belts, the angle pointing in the direction of a center of the belt. The belt with the reinforcement forms an inner acute angle at each of the edge areas.

The reinforcement may be formed as one piece with each of the two belts. The reinforcements preferably have a triangular design with an inner space which is hollow or filled with an elastically compressible filling material. The reinforcements preferably consist of molding rubber or rubber strips that are glued or vulcanized together.

The belt structure is preferably provided such that the rollers are mounted on the inside or within one of the belts. Two short rollers are preferably provided which press one side of a belt and these are integrated in a common bracket which is elastically mounted on a support structure. The bracket is mounted by means of rubber bearings. The rubber bearings permit an angle of movement $\alpha$ of up to 30° in a cross sectional plane of the belt in an angle of movement $\beta$ of 3°–5° around the axis located in the cross sectional plane. The support rollers are preferably arranged with a toe-in angle $\gamma$ in the delivery direction of the belt to facilitate centering the belt. The toe-in angle $\gamma$ is preferably 1°–2° relative to a cross sectional plane.

The cover belt conveyor, comprised of a basic belt and a cover belt, is designed such that the central and edge areas of both belts are continuously pressed against each other with sets of support rollers.

During the delivery of bulk materials or piece goods, the central areas of both belts enclose, due to the design according to the present invention, a delivery strand, which is compressed with sufficient pressure by the belts by means of sets of elastically mounted support rollers. If no material is being delivered, the two belts lie practically flat one on the other.

According to the present invention, the sets of support rollers of only one of the two belts may be mounted elastically. Variations in the amount of material being delivered from zero to a possible maximum are compensated by the sets of elastic support rollers.

At least one of the two belts or both belts have reinforcements made in one piece (glued or vulcanized) with them in the vicinity of their edge areas in the longitudinal direction, which delimit the delivery strand laterally such that no bulk material will enter the area of the belt edges pressed against each other.

The reinforcements have approximately triangular cross section. If only one of the two belts has reinforcements, the reinforcements have a lip toward the inner side for sealing off the delivery strand against the basic belt. The reinforcements consist of molding rubber or rubber strips that were glued or vulcanized together. The hollow spaces of the reinforcements may be empty. However, they may also be filled with foam rubber or the like. The side of the reinforcements directed toward the delivery strand is bulged to the outside in order to be easily adapted to variations in the thickness of the delivery strand. The reinforcements adjoin the belt at acute angles to prevent the glued or vulcanized seam from separating as a consequence of the milling movements. The belt may be provided with transverse reinforcements to increase its transverse rigidity and with longitudinal reinforcements in the edge areas, so that the central area of the cover belt will be able to elongate to the necessary extent while running over convex guides (e.g., deflecting drums). The support rollers are mounted on the inside, i.e., they are provided with nonrotating axes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is another section III/V—III/V in FIG. 2 with support rollers with toe-in.

DETAILED DESCRIPTION OF THE PREFERRED EMBODIMENT

Figure 2:
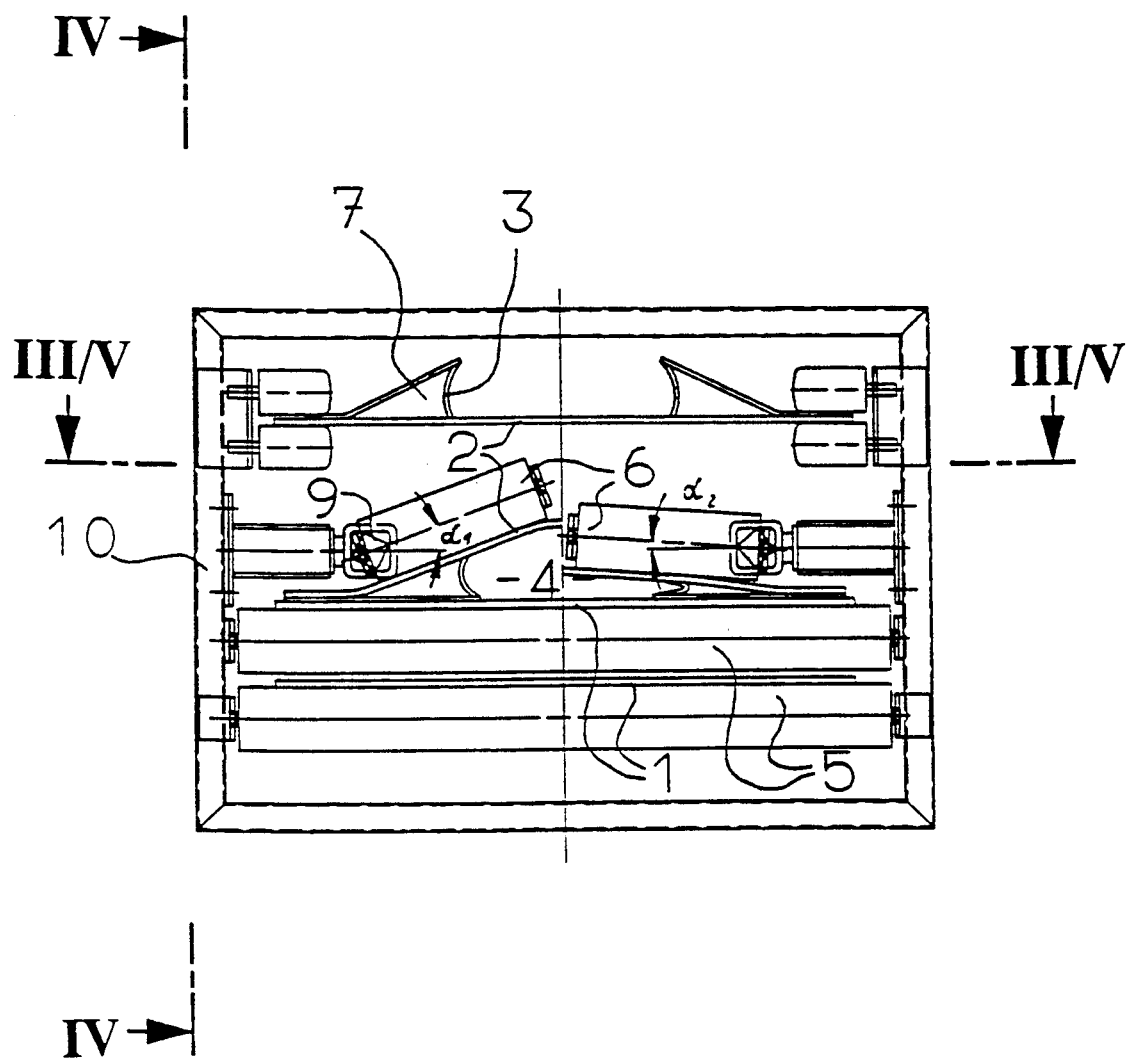
FIG. 2 is a cross section of the cover belt conveyor.
Figure 3B:
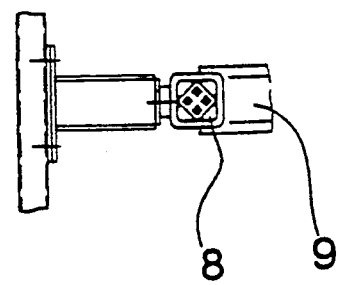
FIG. 3b is a broken away detail of a bracket and rubber bearing taken along line IIIb—IIIa.
Figure 3A:
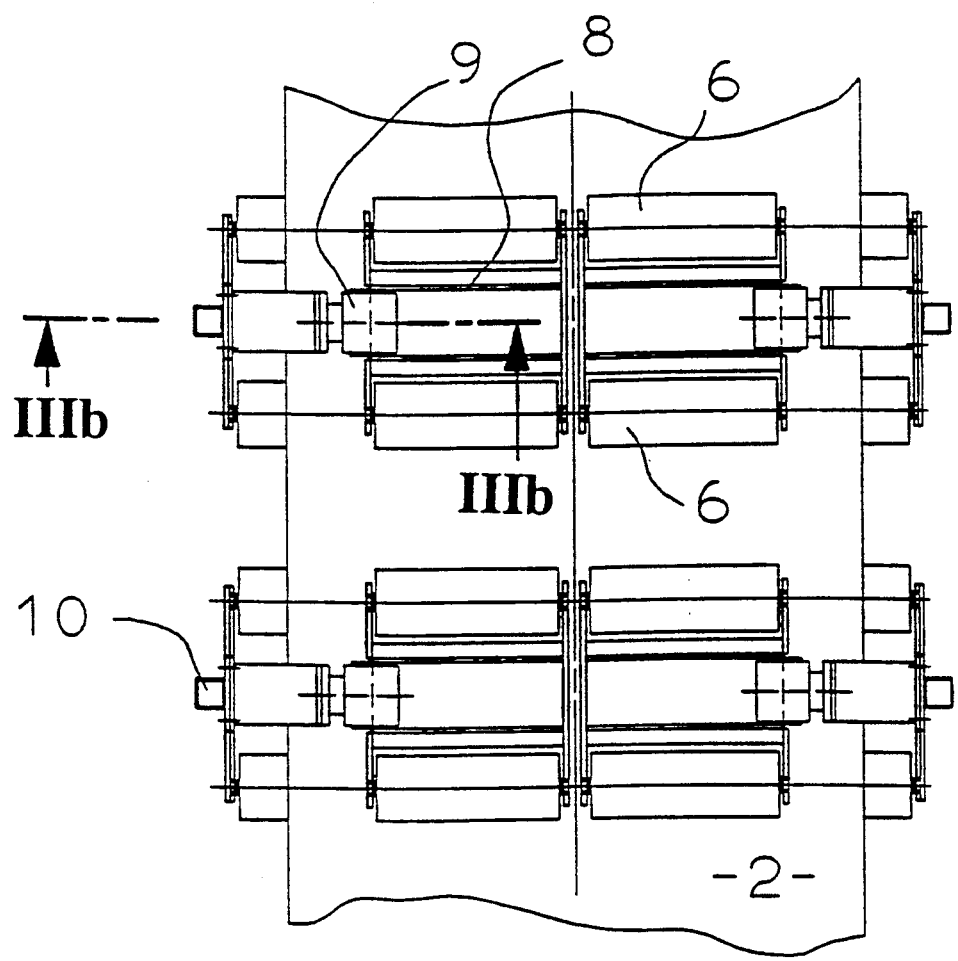
FIG. 3a is a section along line III/V—III/V in FIG. 2.

FIG. 2 shows the cross section of the arrangement of the cover belt conveyor including the cover belt 2 and the basic belt 1, with the support rollers 6 mounted elastically on the support structure 10.

The central areas of both the belts 1, 2 enclose a delivery strand 4, which is compressed with sufficient pressure by the belts 1, 2 by means of sets of elastically mounted support rollers 6.

The sets of support rollers of one belt 2 or of both the belts 1, 2 may be mounted elastically. In the exemplary embodiment, only the sets of support rollers of the cover belt 2 are mounted elastically. Variations in the degree of filling of the cover belt conveyor can be compensated by the elastic mounting, i.e., the support roller position being adjusted to the delivery strand guarantees that the cover belt will always lie on the material being delivered.

Figure 1A:
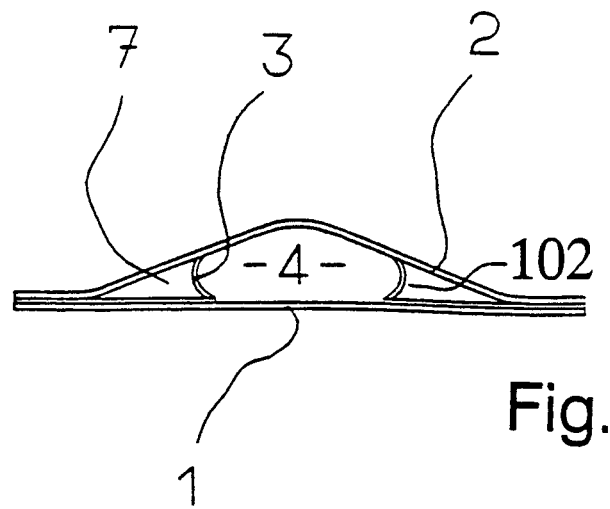
FIG. 1a, 1b and 1c are sectional views of the reinforcements of the cover belt conveyor according to the invention.
Figure 1B:
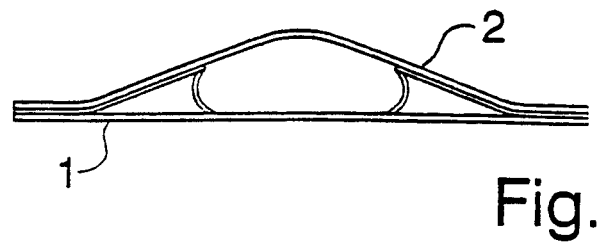
Figure 1C:
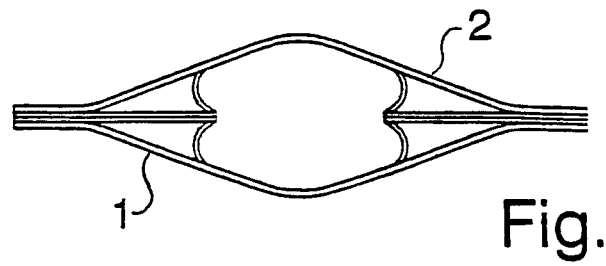

At least one of the two belts 1, 2 has reinforcements made in one piece within the vicinity of its two edge areas, which laterally delimit the strand of material being delivered. It is shown in the individual representations in FIG. 1a-1c that, according to FIG. 1a, either the cover belt 2, or, according to FIG. 1b, the basic belt 1 has the reinforcements 3, or, according to FIG. 1c, the reinforcements are arranged in the edge areas of both the cover belt 2 and the basic belt 1. The reinforcements 3 have an approximately triangular cross section and have, if only one of the belts is provided with the reinforcements, a lip 100 pointing toward the inner side to seal the delivery strand against the basic belt 1. The side 102 of the reinforcement 3 directed toward the delivery strand is bulged in the direction of the outer edge of the cover belt. The side 102 forms an acute angle with the reinforced belt (it encloses an acute angle with the belts in the direction of the center of the belt). The reinforcements adjoin the belt at acute angles.

The elastic deformability of the reinforcements 3 with the lip lying on the basic belt 1 is also recognizable in FIG. 2. The left-hand half of FIG. 2 shows the situation in which the cover belt conveyor is filled maximally, and the right-hand half of the figure shows the empty or minimally filled cover belt conveyor.

The support rollers are mounted on the inside, i.e., they have stationary axes. They are elastically mounted on the roller support station.

The inner spaces 7 of the reinforcements 3 are advantageously provided with a filling (not shown) consisting of foam rubber or the like preferably elastically compressible filling material.

As is apparent from FIGS. 3a through 5, two short support rollers 6 each are integrated within a common bracket 8. The bracket 8 is mounted on the support structure 10 by means of a rubber bearing 9. FIG. 3b shows a detail view of part of the bracket 8 as well as the rubber bearing 9, a prior-art elastic rubber element.

The rubber bearings 9 permit the support rollers 6 to be adjusted by an angle $\alpha$ for adjustment to the filling volume of the cover belt conveyor. In the left-hand half of FIG. 2, the angle occurring in the case of filled cover belt conveyor is designated by $\alpha_1$, and the angle occurring in the case of empty cover belt conveyor in the right-hand half of the figure is designated by $\alpha_2$. The righting force acting on the cover belt and consequently on the material being delivered increases with increasing amount of material being delivered.

Figure 4:
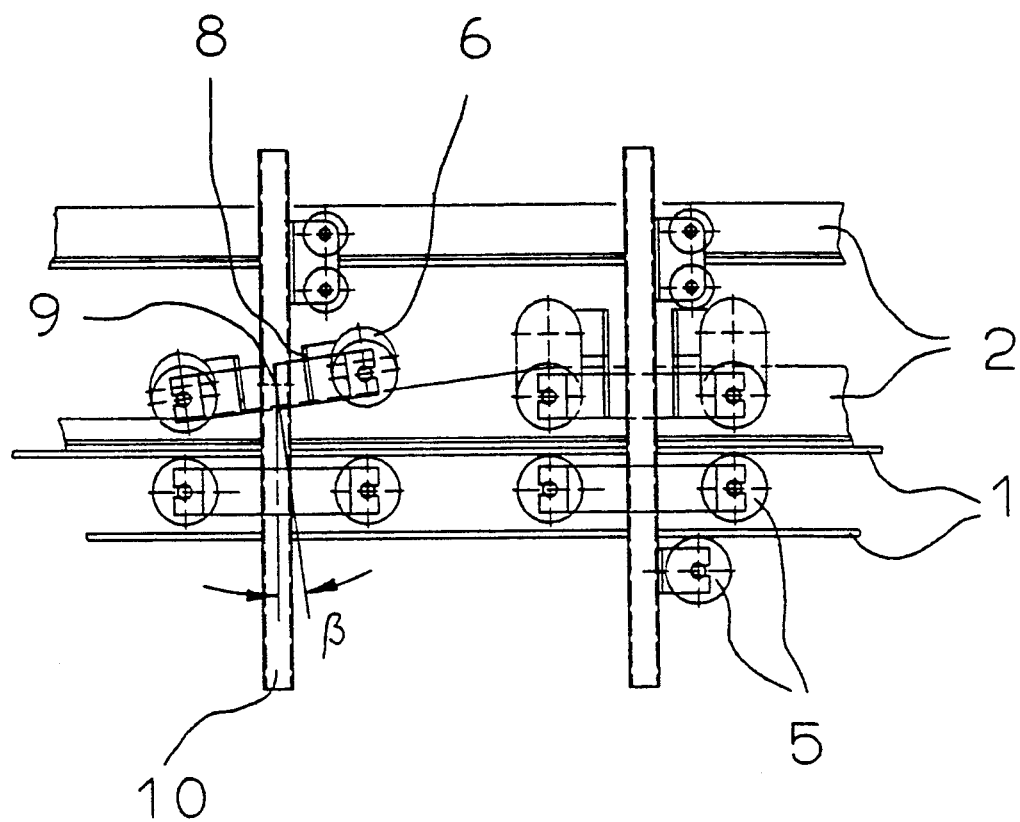
FIG. 4 is a section along line IV—IV in FIG. 2.

As can be seen in FIG. 4, the rubber bearing 9 is to permit rotation of the common bracket 8 by the angle $\beta$, which should be about 5°–10°.

It is thus guaranteed that two the support rollers 6 each, mounted on a common bracket 8, will always remain in contact with the cover belt 2, even if the filling of the delivery strand under the two rollers 6 varies. To enable the rubber bearing 9 to rotate by the angle $\beta$, the rubber bearing 9 should be relatively narrow (see FIG. 4).

Figure 5:
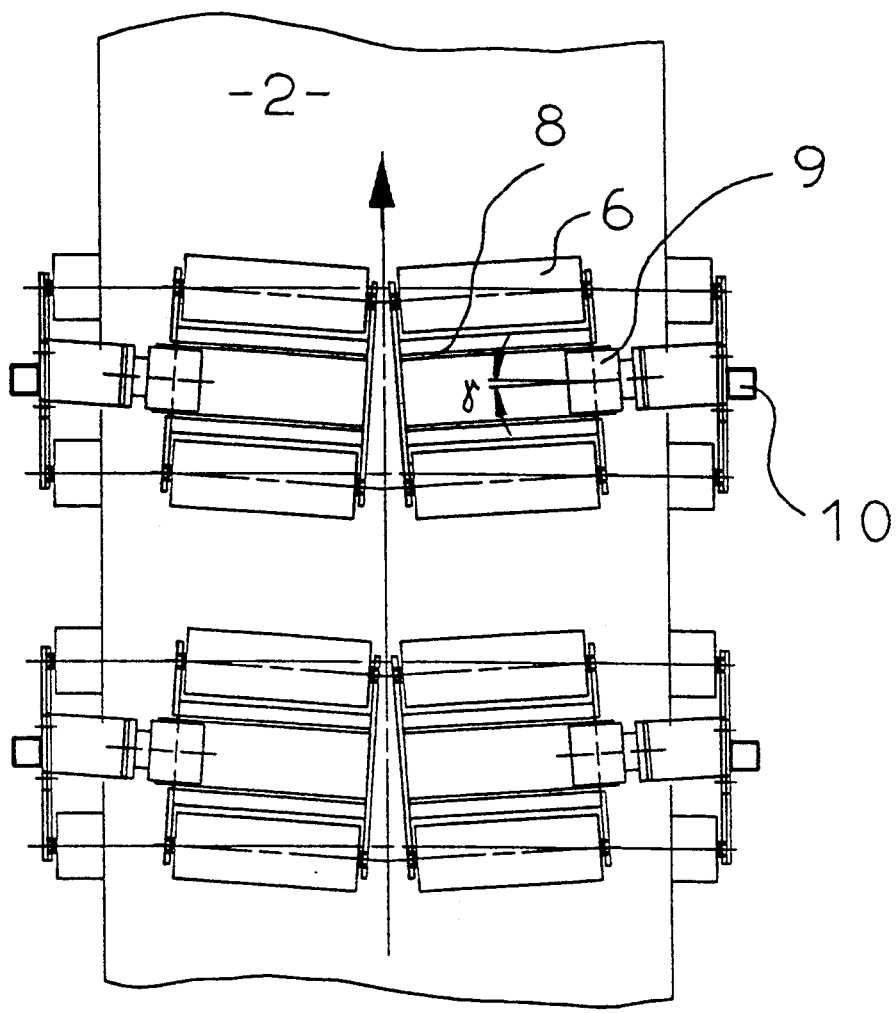

To ensure straight movement of the cover belt conveyor, without using rollers or sliding bars acting against the edges of the belt, as a result of which the edges of the belt would be worn off or damaged in a short time, the short support rollers are advantageously adjusted such that they will have a toe-in against the direction of delivery, as is shown in FIG. 5. The angle $\gamma$ to be set may be 1°–2°. To achieve this, the rubber bearing is mounted at a corresponding angle on the support structure.

The cover belt 2 and the basic belt 1 are always pressed against one another in the area of the belt edges over their entire delivery section. It is therefore normally sufficient to secure only the cover belt against off-track running by the oblique mounting of the short support rollers. In this case, the basic belt 1 must be guided centrally only in front of the point at which it is placed onto the cover belt 2. This can be brought about, for example, by rollers or sliding bars acting against the belt edges in the area, or by means of a so-called carding station.

What is claimed is:

1. A cover belt conveyor, particularly for inclined or vertical delivery of bulk materials and/or piece goods, comprising:

a basic belt;

a cover belt;

rollers for pressing said cover belt onto said basic belt, said rollers being mounted elastically on support structures for changing a delivery cross section of said basic belt and pressed cover belt;

compressible reinforcements made in one piece provided with at least one of said basic belt and said cover belt to form a reinforced belt, said reinforcements being provided at edge areas with respect to a longitudinal direction of said reinforced belt to change said delivery cross section, said reinforcements including sides directed against material being delivered, said sides being bulged in an outward direction of said reinforced belt and said sides enclosing an acute angle with said reinforced belt in a direction of the center of the reinforced belt, said reinforced belt having an edge area forming an inner acute angle.

2. A cover belt conveyor according to claim 1, wherein:

said reinforcements are provided for each of said cover belt and said basic belt.

3. A cover belt conveyor according to claim 1, wherein:

said reinforcements have a triangular shape providing an inner space.

4. A cover belt conveyor according to claim 1, wherein:

said reinforcements are formed of molding rubber or rubber strips which are glued or vulcanized together.

5. A cover belt conveyor according to claim 1, wherein:

said rollers are mounted inside one of said cover belt and said basic belt.

6. A cover belt conveyor according to claim 1, wherein:

said rollers include two rollers pressing said reinforced belt, said rollers being integrated in a common bracket, said common bracket being mounted on said support structure.

7. A cover belt conveyor according to claim 6, wherein:

said common bracket is mounted by means of rubber bearings.

8. A cover belt conveyor according to claim 7, wherein:

said rubber bearings permit an angle of movement $\alpha$ of up to 30° in a cross sectional plane of said belt and an angle of movement $\beta$ of 3°–5° around an axis located in a cross sectional plane.

9. A cover belt conveyor according to claim 6, wherein:

said short support rollers are arranged with a toe-in angle $\gamma$ in a delivery direction of said cover belt and said basic belt.

10. A cover belt conveyor according to claim 9, wherein:

said toe-in angle $\gamma$ is 1°–2° relative to a cross sectional plane.

* * * * *